April 26, 1949.    J. M. GARNIER    2,468,659
STEERING ELEMENTS OF SMALL AND
MEDIUM-SIZED MOTOR CULTIVATORS
Filed Oct. 18, 1946
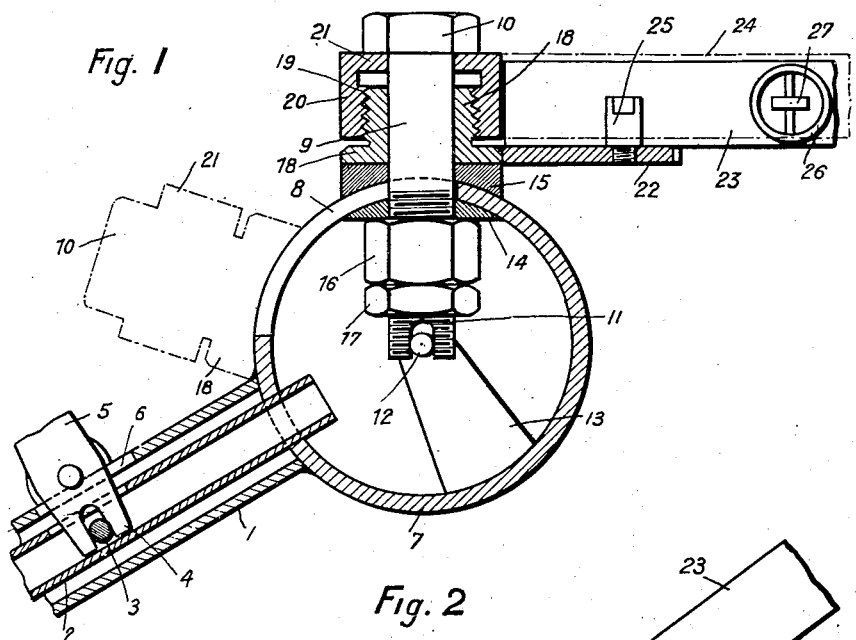
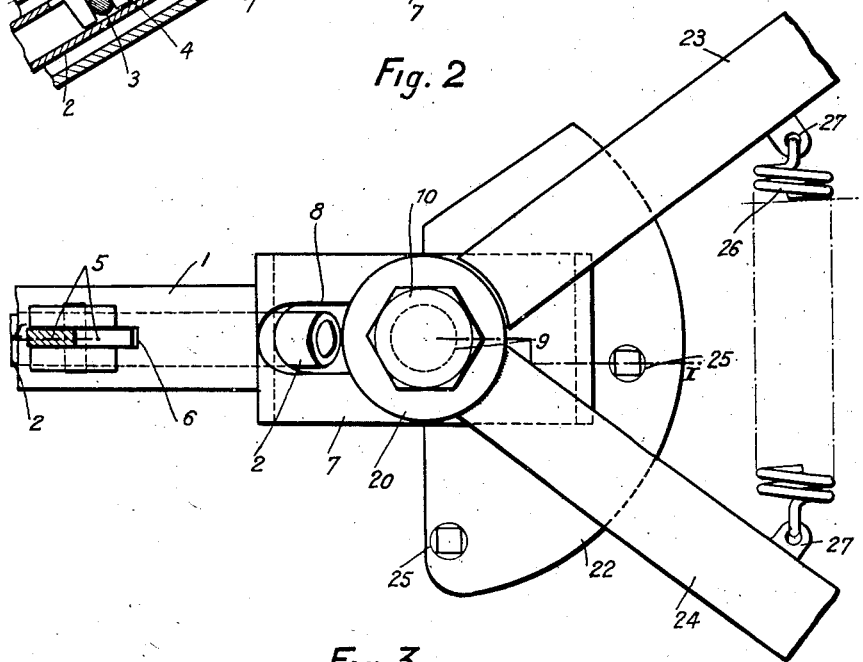
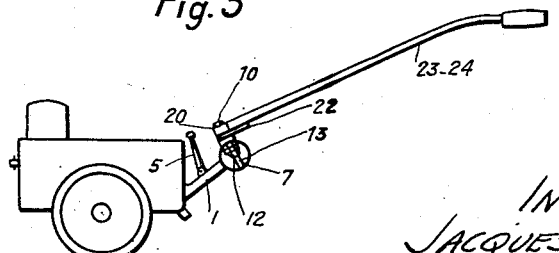
INVENTOR
JACQUES M. GARNIER
BY Young, Emery & Thompson
ATTYS Patented Apr. 26, 1949

2,468,659

UNITED STATES PATENT OFFICE 2,468,659

STEERING ELEMENTS OF SMALL AND MEDIUM-SIZED MOTOR CULTIVATORS

Jacques Marie Garnier, Neuilly sur Seine, France, assignor to M. A. B. E. C. Société Anonyme, Levallois-Perret, France, a corporation of France Application October 18, 1946, Serial No. 703,937
In France January 9, 1945

Section 1, Public Law 690, August 8, 1946
Patent expires January 9, 1965

8 Claims. (Cl. 74—551.3)

On small and medium-sized motor cultivators the steering elements which generally consists of two handles are usually hinged relatively to the body of the cultivator to enable their angle of inclination to be varied, the said elements being adapted to be maintained in the desired position by a locking device. It is in fact necessary to be able to alter the inclination of these elements with a view to adapting the motor cultivator for example to the height of the driver or the nature of the work to be carried out.

The locking devices employed in the known motor cultivators may be either locally or remote controlled from the handle grip of one of the handles through a rod gear or a cable of the "Bowden" type. The first of these methods of control entails a number of drawbacks owing to the fact that it necessitates the driver releasing his hold of the handles to effect the adjustment and that the point of articulation of the said handles is often difficult of access. Moreover, the remote control by means of a rod gear or cable is generally complicated, occupies considerable space and is readily exposed to wear and tear.

The present invention has for its object a regulating device which permits of obviating the above mentioned drawbacks. This device consists mainly on the one hand of a substantially cylindrical surface or part of a surface integral with the said body and having an axis perpendicular to the longitudinal axis of the latter and on the other hand two members adapted to screw one into the other and connected respectively to the two handles of the motor cultivator and interposed between the external part of the cylindrical surface and a stop coupled to an element impinging against the internal part of the said surface, the said two members being adapted to press on the one hand against the stop and on the other hand against the external part of the cylindrical surface.

The cylindrical surface integral with the body of the cultivator may for example be provided with a slot located substantially in the axis of the said cultivator and traversed by a bolt adapted to slide in the said slot and maintained inside the cylindrical surface by a nut. The parts adapted to screw one into the other and integral respectively with each of the handles and traversed by the bolt, are thus applied on the one hand against the head of the said bolt and on the other hand directly or indirectly against the external part of the cylindrical surface, the nut maintaining the bolt being applied in turn directly or indirectly against the internal part of the said surface.

It will be readily conceived that the two parts screwing one into the other act as an expanding separating washer. Any movement apart of the handles for example, causes the said parts to screw one into the other and in consequence leads to a reduction in the thickness of the washer which they constitute, whence it results that the cylindrical surface is no longer tightly held between the said parts and the check nut on the bolt. The latter may then be caused to slide in the slot by raising or lowering the handles. A movement in the opposite direction, for example the bringing of the handles closer together causes the parts engaging one in the other to be unscrewed and thus brings about an increase in their total thickness, the cylindrical surface being again clamped between the said parts and the check nut, so that the bolt is again locked in the new position which they have been given.

Other details of the invention will appear from the following description given with reference to the accompanying drawing which shows by way of example an embodiment of the device according to the invention.

In the drawing:

Fig. 1 is a vertical section of the device;

Fig. 2 is a plan view;

Fig. 3 is a lateral diagrammatic view of the whole motor cultivator fitted with a device in accordance with the invention.

In the device illustrated, 1 is a hollow arm integral with the body of the motor cultivator and in which is adapted to slide a rod 2 actuating the control elements of the motor fitted in the cultivator. The rod 2 incorporates a pin 3 cooperating with a fork 4 carried on the end of an operating lever 5 adapted to pivot on the arm 1 and entering the latter through a slot 6.

On the end of the arm 1 is welded a metal cylinder 7 having its axis perpendicular to that of the said arm and on the surface of which is provided a slot 8 arranged in the prolongation of the arm 1. This slot is traversed by a bolt 9 fitted with a head 10 and the threaded end of which is cut into the shape of a fork and engages with longitudinal play 11 on the spindle 12 centred in the cylinder and mounted on supports 13 fixed to the inside of the cylinder.

Screwed on to the bolt 9 are two washers 14 and 15 each having a cylindrical face corresponding respectively to the internal and external surfaces of the cylinder 7 and adapted to be tightened against the said faces, on the one hand between a nut 16 held by a lock nut 17 and on the other hand a sleeve 18 externally threaded at 19. The said sleeve 18 cooperates with a tapped bush 20 likewise screwed on the shank of the bolt 9 and impinging against the head 10 of the latter through a bearing surface 21.

One of the handles 23 of the motor cultivator is welded on to the bush 20, the other handle 24 being welded on to a segment 22 having two stops 25 limiting the relative displacement of the handle 23 and of the segment 22. Finally, a spring 26 is secured by its respective ends to two lugs 27 carried on the handles 23 and 24. The pitch of the screw thread on the sleeve 18 of the bush 20 is such that the separating of the handles 23 and 24 causes the sleeve to enter the bush and in consequence the unscrewing of the washers 14 and 15 and inversely bringing the handles closer together causes the washers to be tightened against the cylindrical surface 7 thus locking the bolt 9 with respect to the latter. The provision of the segment 22, the stops 25 and the spring 26 is not indispensable.

In order to vary the angle of inclination of the motor cultivator handles for example as a function of the driver's height, it is therefore sufficient to separate the handles by overcoming the action of the spring 26 and give a sharp tap to unlock the washers 14 and 15. By raising or lowering the handles as the case may be the bolt 9 is displaced in the slot 8 and once the handles are in the desired position it is sufficient suddenly to bring them closer together again to lock the whole mechanism in that position.

Fig. 1 shows the two extreme positions for the adjustment of the device, the first position being shown in dashed lines and the second position in dash-dot lines.

As will be apparent this adjustment is obtained direct by acting on the handles, without the need for releasing the latter and without the aid of a remote control from the handle grips, for example by means of a flexible cable of the "Bowden" type.

I claim:

1. An adjustable steering mechanism for manually steered apparatus comprising a support having internal and external concentric cylindrical surfaces, said support being fixed to the apparatus, an internal clamping element engaging the inner cylindrical surface of the support, an external clamping element engaging the external cylindrical surface of the support, a pair of interthreaded members, means interconnecting the interthreaded members and clamping elements, and a steering handle carried by each of said interthreaded members for effecting relative rotation of said members to clamp said clamping elements onto and release the same from the cylindrical surfaces of the support whereby the clamping elements, stud and associated members may be shifted to different positions on the support.

2. An adjustable steering mechanism for manually steered apparatus comprising a support having internal and external concentric cylindrical surfaces, said support being fixed to the apparatus, an internal clamping element engaging the inner cylindrical surface of the support, an external clamping element engaging the external cylindrical surface of the support, a stud extending through said clamping elements, stops on the inner and outer ends of said stud, a pair of interthreaded members mounted on the stud between the external clamping element and the external stop, and a steering handle carried by each of said interthreaded members for effecting relative rotation of said members to clamp said clamping elements onto and release the same from the cylindrical surfaces of the support whereby the clamping elements, stud and associated members may be shifted to different positions on the support.

3. An adjustable steering mechanism for manually steered apparatus comprising a support having internal and external concentric cylindrical surfaces, said support being fixed to the apparatus and having a circumferential slot formed therein, an internal clamping element engaging the inner cylindrical surface of the support, an external clamping element engaging the external cylindrical surface of the support, a stud extending through said clamping elements, and said slot, stops on the inner and outer ends of said stud, a pair of interthreaded members mounted on the stud between the external clamping element and the external stop, and a steering handle carried by each of said interthreaded members for effecting relative rotation of said members to clamp said clamping elements onto and release the same from the cylindrical surfaces of the support whereby the clamping elements, stud and associated members may be shifted to different positions on the support.

4. An adjustable steering mechanism for manually steered apparatus comprising a support having internal and external concentric cylindrical surfaces, said support being fixed to the apparatus, and having a circumferential slot formed therein, an internal clamping element engaging the inner cylindrical surface of the support, an external clamping element engaging the external cylindrical surface of the support, a bolt having a head and extending through said clamping elements and slot, a pair of interthreaded members mounted on the bolt between the head and the external clamping element, a nut on the inner end of the bolt, and a steering handle carried by each of said interthreaded members for effecting relative rotation of said members to clamp said clamping elements onto and release the same from the cylindrical surfaces of the support whereby the clamping elements, stud and associated members may be shifted to different positions on the support.

5. An adjustable steering mechanism for manually steered apparatus comprising a support having internal and external concentric cylindrical surfaces, said support being fixed to the apparatus, and having a circumferential slot formed therein, an internal clamping element engaging the inner cylindrical surface of the support, an external clamping element engaging the external cylindrical surface of the support, a bolt having a head and extending through said clamping elements and slot, a pair of interthreaded members mounted on the bolt between the head and the external clamping element, a nut on the inner end of the bolt, and a steering handle carried by each of said interthreaded members for effecting relative rotation of said members to clamp said clamping elements onto and release the same from the cylindrical surfaces of the support whereby the clamping elements, stud and associated members may be shifted to different positions on the support, and means for locking said nut on said bolt.

6. An adjustable steering mechanism for manually steered apparatus comprising a support having internal and external concentric cylindrical surfaces, said support being fixed to the apparatus, and having a circumferential slot formed therein, an internal clamping element engaging the inner cylindrical surface of the support, an external clamping element engaging the external cylindrical surface of the support, a bolt having a head and extending through said clamping elements and slot, a pair of interthreaded members mounted on the bolt between the head and the external clamping element, a nut on the inner end of the bolt, and a steering handle carried by each of said interthreaded members for effecting relative rotation of said members to clamp said clamping elements onto and release the same from the cylindrical surfaces of the support whereby the clamping elements, stud and associated members may be shifted to different positions on the support, the inner end of said bolt having a transverse slot therein, and a shaft extending axially through said support and the slot in the end of the bolt.

7. An adjustable steering mechanism for manually steered apparatus comprising a support having internal and external concentric cylindrical surfaces, said support being fixed to the apparatus, and having a circumferential slot formed therein, an internal clamping element engaging the inner cylindrical surface of the support, an external clamping element engaging the external cylindrical surface of the support, a bolt having a head and extending through said clamping elements and slot, a pair of interthreaded members mounted on the bolt between the head and the external clamping element, a nut on the inner end of the bolt, and a steering handle carried by each of said interthreaded members for effecting relative rotation of said members to clamp said clamping elements onto and release the same from the cylindrical surfaces of the support whereby the clamping elements, stud and associated members may be shifted to different positions on the support, and resilient means urging said handles to a position to effect clamping of the clamping elements on said support.

8. An adjustable steering mechanism for manually steered apparatus comprising a support having internal and external concentric cylindrical surfaces, said support being fixed to the apparatus, and having a circumferential slot formed therein, an internal clamping element engaging the inner cylindrical surface of the support, an external clamping element engaging the external cylindrical surface of the support, a bolt having a head and extending through said clamping elements and slot, a pair of interthreaded members mounted on the bolt between the head and the external clamping element, a nut on the inner end of the bolt, and a steering handle carried by each of said interthreaded members for effecting relative rotation of said members to clamp said clamping elements onto and release the same from the cylindrical surfaces of the support whereby the clamping elements, stud and associated members may be shifted to different positions on the support, and resilient means urging said handles to a position to effect clamping of the clamping elements on said support.

JACQUES MARIE GARNIER.

REFERENCES CITED

The following references are of record in the file of this patent:

UNITED STATES PATENTS

| Number | Name | Date |
| --- | --- | --- |
| 1,858,618 | Carlson | May 17, 1932 |
| 2,052,068 | Ziegler | Aug. 25, 1936 |

FOREIGN PATENTS

| Number | Country | Date |
| --- | --- | --- |
| 594,537 | France | Nov. 20, 1926 |